United States Patent [19]

McGuire

[11] 4,182,138
[45] Jan. 8, 1980

[54] ROTARY ENERGY STORAGE DEVICE

[75] Inventor: Dennis P. McGuire, Erie, Pa.

[73] Assignee: Lord Corporation, Erie, Pa.

[21] Appl. No.: 774,578

[22] Filed: Mar. 4, 1977

[51] Int. Cl.$^2$ .................. F16D 3/17; F16F 15/04; G05G 1/00

[52] U.S. Cl. .................. 64/11 R; 74/572; 74/574; 248/613; 416/134 R

[58] Field of Search .......... 74/572, 574; 416/106, 416/131, 134, 500; 64/11 R, 11 B, 11 P, 11 F; 248/358 R

[56] References Cited

U.S. PATENT DOCUMENTS

| | | | |
|---|---|---|---|
| 1,157,921 | 10/1915 | Banks | 64/11 R |
| 2,207,496 | 7/1940 | Anderson, Jr. | 64/11 R |
| 2,312,822 | 3/1943 | Julien et al. | 416/131 |
| 2,491,229 | 12/1949 | Taylor | 248/358 R |
| 2,766,626 | 10/1956 | Ritter | 74/574 X |
| 2,859,637 | 11/1958 | Hagenlocher | 74/574 |
| 2,973,633 | 3/1961 | Hall | 64/11 R |
| 3,023,593 | 3/1962 | Nallinger | 64/11 R X |
| 3,053,063 | 9/1962 | Lilleberg | 64/11 R |
| 3,301,341 | 1/1967 | Fathauer | 248/358 R X |
| 3,788,162 | 1/1974 | Rabenhorst et al. | 74/572 |
| 3,874,815 | 4/1975 | Baskin | 416/134 R |
| 3,999,887 | 12/1976 | McGuire | 416/134 A |

FOREIGN PATENT DOCUMENTS 826046  12/1959  United Kingdom ............. 248/358 R

*Primary Examiner*—James C. Yeung
*Assistant Examiner*—Daniel J. O'Connor
*Attorney, Agent, or Firm*—Maurice R. Salada; John A. Gazewood

[57] ABSTRACT

A rotary energy storage device comprises a rotor and a hub for mounting the rotor on a shaft. The rotor is joined to the hub by an interlayer disposed between the rotor and hub. One surface of the interlayer is bonded to a mounting surface of the hub. A second surface of the interlayer, which is opposite the first surface, is bonded to a surface of the rotor which is opposite and spaced from the mounting surface of the hub. Due to differences in their constructions, such as their relative dimensions, the rotor and the hub experience different strains due to the centrifugal forces exerted during rotation of the energy storage device. The difference between the strain at the mounting surface of the hub and the strain at the opposed surface of the rotor induces a shear stress in the interlayer. To accommodate the induced shear stress, the interlayer has a thickness and a shear modulus which permit the interlayer to deflect in response to the difference in strains without structural or bond failure. The interlayer can be effective to accommodate the induced shear stress at any speed of the energy storage device up to the speed at which the rotor would fail due to centrifugal loads imposed upon it. The interlayer is preferably formed of a body of elastomer and is preferably bonded to the hub and rotor adjacent an area of maximum strain differential between the hub and rotor.

28 Claims, 6 Drawing Figures

ROTARY ENERGY STORAGE DEVICE

BACKGROUND OF THE INVENTION

Flywheels have long been used as energy storage devices. Because it is an inertial device governed by the laws of kinetic energy, a flywheel has an energy storage capacity that increases with increasing rotational speed. The energy storage capacity of a flywheel also increases with increasing spinning radius. Spinning radius is equivalent to the physical radius of a circular flywheel, for example. Generally speaking, the energy storage capacity of a flywheel is directly proportional to the square of rotational velocity and to the square of spinning radius.

The maximum energy storage capacity of a flywheel is limited by the specific strength, or ratio of strength to density, of the material used to fabricate the flywheel. In order to produce a flywheel that potentially has a high energy storage capacity, a material with a high specific strength must be used to build the flywheel. The rotational speed and spinning radius or size of the flywheel can then be proportioned relative to each other to maximize the stress or energy stored in the flywheel material without exceeding the ultimate strength of the material. In fixed installations, such as electrical power generating stations, it may be acceptable to have a flywheel that is large in size and rotates at a relatively low velocity. For use in a vehicle, on the other hand, a flywheel may have to be small in size and, therefore, rotate at a high velocity. Since a high energy flywheel should have an energy storage capacity or energy density of at least 10 watt-hours per pound, and preferably 30 or more watt-hours per pound, the rotational speeds required of a small size flywheel (e.g., 12 to 24 inches in radius) to achieve high energy storage capacity are in the range of 10,000 to 100,000 revolutions per minute. Nonetheless, such speeds of a shaft are attainable with presently known drive trains. Consequently, the major problem of current interest is to select materials for a flywheel and so to construct the flywheel that it will attain the highest possible rotational speed without disintegrating or bursting.

In the past, high strength steel has routinely been chosen as the material of which to construct a flywheel. Steel has a specific strength such that the maximum energy storage capacity or energy density of an isotropic steel flywheel is about 2 to 5 watt-hours per pound. More recently, however, anisotropic filamentary materials have been developed which have ratios of uniaxial strength to density that are substantially greater than that of isotropic steel members. As a result, energy storage capacities or energy densities of 120 watt-hours per pound or more are now theoretically possible using such materials. High strength filamentary materials may be wound about a central hub, for example, to produce a circular flywheel. Alternatively, the filaments may be disposed normal to the axis of rotation of the flywheel. When such filamentary elements are disposed normal to the axis of rotation of the flywheel, the filaments may be individually secured to a central hub or they may be bonded together in a matrix material to form a solid or continuous rotor. Substantial work in the field of filamentary flywheel structures has recently been done by David W. Rabenhorst of the Applied Physics Laboratory at The Johns Hopkins University. Mr. Rabenhorst is the inventor or co-inventor of several patented flywheel designs employing filamentary elements, which are described and illustrated in patents such as: Rabenhorst U.S. Pat. Nos. 3,672,241; Rabenhorst 3,698,262; Rabenhorst 3,737,694; Rabenhorst et al 3,788,162; Rabenhorst 3,884,093; and Rabenhorst 3,964,341.

Particularly when nonisotropic, filamentary structures are utilized as flywheels or similar rotors, difficulty is encountered in securely attaching such flywheels or rotors to a drive shaft. One approach, which is illustrated in FIG. 2 of Rabenhorst U.S. Pat. No. 3,884,093 and FIG. 8 of Rabenhorst et al U.S. Pat. No. 3,788,162, is to pierce the flywheel or rotor with either the drive shaft itself or an associated attachment mechanism, such as a rod or bolt. An inherent problem with piercing a flywheel or rotor, however, is that the maximum stresses developed in the flywheel at any rotational speed are significantly increased. An increase in the stresses produced in a flywheel or rotor will correspondingly reduce the maximum speed at which the flywheel may be rotated without bursting. Reduction in the ultimate bursting speed of the flywheel reduces the energy storage capacity of the flywheel.

The foregoing disadvantage which arises from piercing a flywheel to attach it to a drive shaft may be better understood by considering a hypothetical solid flywheel of circular shape and uniform thickness throughout. In such a flywheel, the maximum radial and tangential stresses ($S_R$ and $S_T$) due to centrifugal force both occur at the center of the flywheel and are equal to each other. The stresses are determined by the following equation:

$$S_T = S_R = \frac{1}{8} \frac{P\omega^2}{386.4} (3 + \mu)r^2. \qquad (1)$$

In equation (1), P is the density of the flywheel material in pounds per cubic inch, $\omega$ is the rotational velocity of the flywheel in radians per second, $\mu$ is Poisson's ratio for the flywheel material, and r is the radius of the flywheel in inches. For an identical disc-shaped flywheel having a central opening formed to accept a drive shaft, for example, the tangential stress ($S_T'$) in the flywheel due to centrifugal force is the critical stress. The maximum tangential stress occurs at the internal circumference of the annular flywheel and is determined by the following equation:

$$S_{T'} = \frac{1}{4} \frac{P\omega^2}{386.4} [(3 + \mu)r_1^2 + (1 - \mu)r_2^2]. \qquad (2)$$

In equation (2), P, $\omega$ and $\mu$ have the same meaning as in equation (1), while $r_1$ is the outer radius of the flywheel in inches and $r_2$ is the inner radius of the flywheel in inches. By comparing equation (1) with equation (2), it is readily apparent that if the densities, rotational velocities, and outer radii of the two flywheels are equal, placing an opening of any radius or diameter in a flywheel will more than double the maximum stress. Consequently, an annular flywheel will have less than one-half the energy storage capacity of a substantially identical, solid disc-shaped flywheel. Similar calculations can be made for other flywheel or rotor shapes, such as the rod-like rotor shown in FIG. 2 of Rabenhorst U.S. Pat. No. 3,672,241.

Another method of attaching a drive shaft to a flywheel or rotor, which has been used particularly with flywheels fabricated of high strength filamentary elements, is to provide an enlarged flange or hub at one end of the drive shaft and to bond the hub directly to the flywheel or rotor. An example of such an attachment is shown in FIG. 2 of Rabenhorst et al U.S. Pat. No. 3,788,162. Bonding a flywheel to a shaft avoids the reduction in energy storage capacity which results from piercing a flywheel to attach a drive shaft. Nonetheless, testing of flywheels bonded to drive shafts has resulted in repeated failures of the attachment prior to attaining the maximum energy storage capacities of the flywheels being mounted, as represented by the bursting speeds of the flywheels. Such failures at flywheel-hub interfaces have continued to occur despite the use of high strength epoxy-based structural adhesives to bond the flywheels to the hubs.

SUMMARY OF THE INVENTION

The present invention is directed to a rotary energy storage device in which a flywheel or rotor is joined to a rotating drive shaft in such a manner as to permit the attainment of the maximum rotational speed of the rotor without any unintended prior failure of the rotor-to-shaft connection. A rotary energy storage device according to the present invention comprises a rotor and a hub that is coupled to a rotatable shaft. The rotor is joined to the hub by an interlayer disposed between them. One surface of the interlayer is bonded to a mounting surface of the hub. A second surface of the interlayer is bonded to a mounting surface of the rotor spaced from the mounting surface of the hub. Because of differences in their construction, such as their relative dimensions, the rotor and the hub experience different strains due to centrifugal force when the energy storage device is rotated. The difference between the strain experienced at the mounting surface of the hub and the corresponding strain experienced at the mounting surface of the rotor induces a shear stress in the interlayer disposed between the hub and rotor. In order to accommodate the shear stress induced by the different strains in the hub and rotor, the interlayer has a thickness and a shear modulus which have a predetermined interrelationship that permits the interlayer to deform in response to the strain differential without structural or bond failure. The interlayer can be designed to be effective in accommodating the differential strain induced shear stress at any rotational speed of the energy storage device up to the speed at which the rotor would fail due to centrifugal loads imposed upon it.

As should be apparent from the foregoing description, the present invention results from a recognition that the previously encountered failures of flywheels at their hub-to-rotor interfaces arose from a difference between the mechanical strains imposed on the rotor and hub. The difference between the strain imposed on the rotor and the strain imposed on the hub can readily be seen by reference to equation (1) above. Assuming that both the rotor and the hub are flat, solid discs, and further assuming a rotor diameter of twenty-four inches (24") and a hub diameter of three inches (3"), the stresses imposed on the hub and the rotor are in the same proportion as the squares of their respective radii. Thus, for the diameters assumed here, the stress on the rotor will be 64 times the stress on the hub. Applying Hookes' law and assuming that the rotor and the hub have the same shear modulus, the ratio of the strains imposed on the rotor and hub will be the same as the ratio of the stresses. If the shear modulus of the rotor is less than the shear modulus of the hub, which would be true of a filamentary rotor and a steel hub, for example, the ratio of the strains will be greater than the ratio of the stresses.

The difference in the strains imposed on the rotor and hub induces a shear stress on any adhesive material disposed at the interface between the hub and the rotor. The stress on the adhesive will be inversely proportional to the thickness of the adhesive layer and directly proportional to the shear modulus of the adhesive. A layer of epoxy adhesive will typically be only a few thousandths of an inch thick and will have a shear modulus on the order of $2 \times 5 \times 10^5$ psi and an ultimate shear strength of 5,000–12,000 psi. As indicated by the shear modulus and ultimate strength, an epoxy adhesive can only accommodate 5–10% strain prior to failure. Consequently, a layer of such adhesive interposed between a hub and a rotor which are both fabricated of steel, for example, and which have the relative dimensions given above will fail in shear at a rotational speed of about 7 to 8,000 rpm. The failure speed of the epoxy is significantly less than the maximum rotational speed of the rotor as determined by the theoretical ultimate strength of the rotor material or, in other words, the speed at which the rotor would burst. The present invention thus proposes to interpose between the hub and the rotor an interlayer fabricated of a material that can be readily deflected in shear so as to accommodate, without structural or bond failure, the differential between the strains imposed on the hub and the rotor when the rotor or flywheel is rotated.

In a preferred embodiment of the invention, the interlayer includes a body of elastomer. Since the shear modulus of a body of elastomer can be as low as 50 psi, the elastomer in the interlayer can readily be deflected in shear to accommodate the difference in the hub and rotor strains without being stressed beyond its ultimate shear strength. In situations where the interlayer is bonded to the hub and rotor by layers of adhesive, the elastomer in the interlayer can preferentially accommodate substantially all of the difference in the strains experienced by the hub and the rotor. The differential strain induced shear stress in the adhesive layers can be reduced by a factor of as much as $10^4$ and thus be kept below the ultimate shear strength of the adhesive. In the preferred construction of the interlayer, the surfaces at which the interlayer is bonded to the hub and to the rotor are surfaces of the body of elastomer. In one embodiment, the two surfaces are opposed surfaces of a single body of elastomer. The bonds between the interlayer and the rotor and hub may be either bonds produced by vulcanization, if the materials permit such a bond, or bonds provided by layers of adhesive.

For maximum utilization of the present invention, the interlayer should be disposed adjacent to a point of maximum strain differential between the hub and the rotor. Points or areas of maximum strain differential will occur where a point or area of maximum stress in the rotor is disposed adjacent to the hub. Thus, the surface of the rotor to which the interlayer is bonded should be adjacent to the portion of the rotor which has the largest diameter or similar dimension measured across the rotor normal to its axis of rotation.

Although the present invention is directed to accommodating the strain induced shear stress imposed at the interface between a hub and a rotor, the utilization of an interlayer that includes a body of elastomeric material will also provide other benefits. Thus, for example, by appropriate selection of the shear modulus, diameter, and thickness of the elastomeric material, the fundamental resonance or natural frequency of the rotor and hub combination may be adjusted to occur at a speed well below the nominal operating speed of the rotor. As a result, the rotor can rotate, at its operating speed, about its center of mass rather than about its geometric center or the center line of the drive shaft, for example. Although the elastomer may well be subject to a steady radial shear strain proportional to any unbalance in the rotor, it is less critical to have a balanced rotor for operation at speeds above the natural frequency of the rotor and hub combination. By eliminating the need for critical balancing of the rotor, mass production of flywheels can be facilitated. Moreover, the natural damping provided by elastomeric materials can help to control the resonant movements of the rotor as it passes through the natural frequencies of vibration of the hub and rotor combination. The resilience of the interlayer will also generally help to reduce the transmission of vibrations, particularly torsional and radial vibrations, to and from the rotor, while permitting deflections, such as flapping, of a relatively flexible rotor.

It should be recognized that bodies of elastomer have previously been utilized to control the transmission of vibrations between two interconnected rotating elements, to permit flapping motions of one of two interconnected rotating elements, and to facilitate momentary or instantaneous variations in the rotational speeds of two interconnected rotating elements without failure of the connection between them. The use of bodies of elastomer for such purposes has previously been proposed in connection with: mounting fan blades on a drive shaft, as described and illustrated in German Pat. No. 759,535, granted Jan. 19, 1953; mounting the blades of a propeller for a fixed-wing aircraft on the drive shaft for the propeller, as described and illustrated in British Pat. No. 498,224 and Julien et al U.S. Pat. No. 2,312,822; and for mounting the rotor blades of a helicopter on a drive shaft, as described and illustrated in Baskin U.S. Pat. No. 3,874,815 and in a prior patent of the present inventor, namely, McGuire U.S. Pat. No. 3,999,887. The use of a body of elastomer to accommodate torsional stresses and strains, caused by differences between the rotational speeds of two interconnected rotating members, in mounting a flywheel to a shaft is shown in Hagenlocher U.S. Pat. No. 2,859,637. Nonetheless, none of the foregoing patents recognizes the possibility of accommodating differences in radially directed shear strains through the use of an elastomeric interlayer. One clear reason for the failure of the patents mentioned above to consider such a possibility is that each of the rotary devices described and illustrated in the patents has a relatively low energy storage capacity. More specifically, the normal operating speeds and spinning radii or sizes of the devices shown in the patents are such that the energy storage capacities of the devices appear to be about 1 to b 2 watt-hours per pound or less. The low energy storage capacities of the devices reflect the relatively low stress levels encountered in the devices due solely to centrifugal force. With low stress levels due to centrifugal force, there is little, if any, difference in strains which must be accommodated between elements such as a rotor and a hub.

BRIEF DESCRIPTION OF THE DRAWING

For a better understanding of the invention, reference may be made to the following description of three exemplary embodiments, taken in conjunction with the figures of the accompanying drawing, in which.

DESCRIPTION OF EMBODIMENTS

Figure 1:
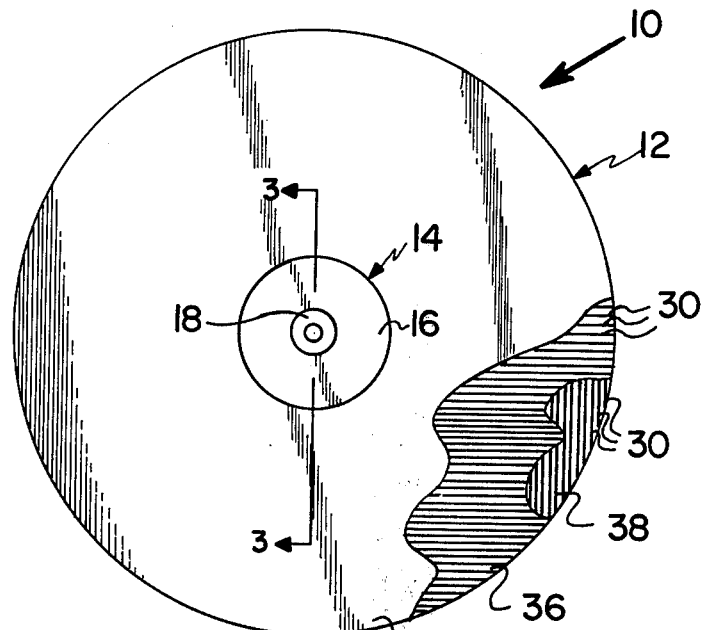
FIG. 1 is a plan view of a rotary energy storage device according to the present invention.
Figure 2:
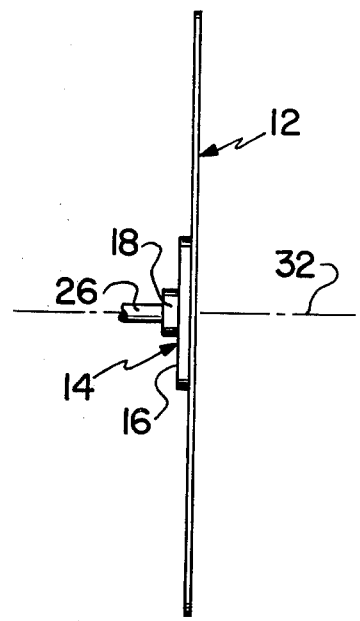
FIG. 2 is a side view of the rotary energy storage device of FIG. 1.
Figure 3:
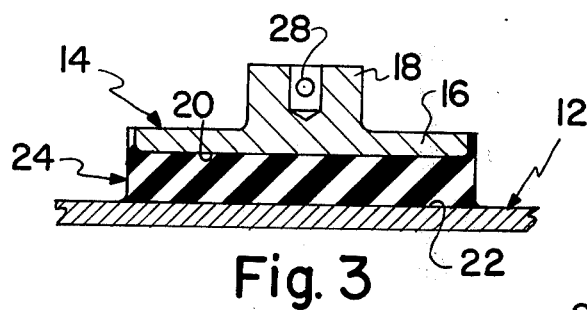
FIG. 3 is a partial sectional view of the rotary energy storage device of FIG. 1, taken along view line 3—3 of FIG. 1.

FIG. 1 of the drawing illustrates, in plan view, a rotary energy storage device 10. The energy storage device 10 includes a disc-like rotor element 12 and a smaller diameter hub 14. As best shown in FIGS. 2 and 3, the hub 14 includes a flat, circular flange portion 16 with a tubular socket portion 18 extending from the center of one side of the flange portion. The side of the flange portion 16 opposite the tubular socket portion 18 affords a flat, circular mounting surface 20 that is presented to but spaced from a parallel and opposed surface 22 of the rotor 12. Disposed between and bonded to the two surfaces 20 and 22 is an interlayer 24 formed of an elastomeric material, for example. The interlayer 24 thus joins the hub 14 to the rotor 12. To permit a rotational input to be transmitted to the rotor 12, the socket portion 18 of the hub 14 receives an elongated rotatable shaft 26. The shaft 26 is held in place in the socket portion 18 by a pin (not shown) that fits into a hole 28 formed transversely through the socket portion and into an aligned hole formed in the shaft 26.

Both the rotor 12 and the hub 14 may be fabricated of a homogeneous, isotropic material such as high strength steel or aluminum. In the illustrated embodiment, the hub 14 is fabricated of metal, while the rotor 12 is fabricated of a number of layers or sheets of anisotropic high strength fibers 30 embedded in a resin matrix, as best shown in FIG. 1. The fibers may be any high strength filamentary material, while the resin matrix may be fabricated of any matrix material compatible with the filamentary material. Suitable high strength filamentary materials include graphite fibers, boron filaments, glass fibers and fibers manufactured of a material marketed under the tradename Kevlar by E. I. du Pont de Nemours & Co. Suitable matrix materials include epoxy resins and polyesters. Each of the filaments 30 extends across the rotor 12 and is oriented transverse to the central axis 32 of the rotor and the energy storage device 10. The filaments or fibers 30 in each layer of the rotor 12 are generally unidirectionally aligned within the layer. Thus, the uppermost layer 34 shown in FIG. 1 has its fibers 30 aligned generally vertically with respect to the bottom of the drawing. The underlying layer 36 has its fibers 30 oriented generally perpendicular to the fibers in the layer 34 or generally horizontally with respect to the bottom of the drawing. A third layer 38 of the rotor 12 has its fibers 30 oriented generally parallel to the fibers or filaments of the uppermost layer 34. Any number of different fiber orientations in successive layers of the rotor 12 are possible, as shown, for example, in the various figures of Rabenhorst et al U.S. Pat. No. 3,788,162. With the various filamentary layers bonded together, as shown in FIG. 1, the rotor 12 can approximate a body of isotropic characteristics.

Figure 4:
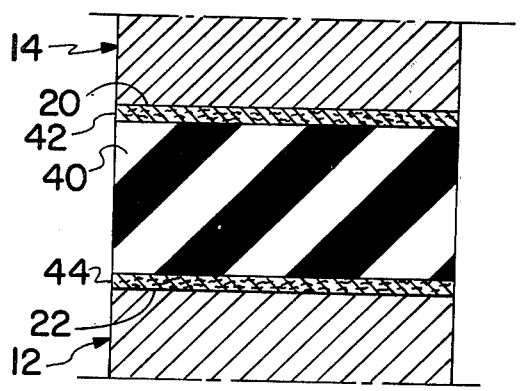
FIG. 4 is a view, on an enlarged scale, of a portion of the sectional view presented in FIG. 3.

The interlayer 24 disposed between the mounting surface 20 of the hub 14 and the opposed surface 22 of the rotor 12 is essentially a flat disc of elastomer 40. The body of elastomer 40 may be fabricated of natural rubber or a synthetic elastomer. The important characteristic of the interlayer 24 is that the material or materials incorporated into the interlayer should cause the interlayer to have a relatively low shear modulus, for reasons that will become apparent. As best shown in FIG. 4, one surface of the body of elastomer 40 is bonded to the mounting surface 20 of the hub 14 by a layer of adhesive 42. The adhesive may be an epoxy based adhesive or a halogenated rubber based adhesive, for example. The opposite surface of the body of elastomer 40 is bonded to the surface 22 of the rotor 12 by another layer of adhesive 44. Depending upon the character of the materials used to fabricate the rotor 12 and the hub 14, it might be possible to vulcanize the body of elastomer 40 directly to the surfaces 20 and 22 without the use of adhesive layers. Nonetheless, in most situations, the adhesive layers 42 and 44 will be required.

In operation of the energy storage device 10, the shaft 26 is rotated by a conventional drive unit (not shown). The rotation of the shaft is transmitted through the hub 14 and the interlayer 24 to the rotor 12. It is expected that the rotor 12 will normally turn at rotational speeds in the range of 10,000 to 60,000 or more revolutions per minute. At such rotational speeds, the centrifugal force imposed on the rotor 12 will be substantially greater than the force imposed on the hub 14 due to the difference in the maximum diameters of the rotor and the hub. The centrifugal forces imposed on the hub 14 and the rotor 12 produce radial and tangential stresses in the hub and rotor and resultant strains. Because of the difference in the centrifugal forces imposed on the rotor 12 and the hub 14, there will be a difference between the strains imposed on the two elements. In addition, since the materials of which the rotor 12 is fabricated typically have significantly lower elastic moduli than the metal of which the hub is fabricated, the strain experienced by the rotor will be further increased with respect to the strain experienced by the hub.

Due to the difference between the strain experienced by the rotor 12 along the surface 22, for example, and the strain experienced by the hub 14 along the surface 20, for example, shear stresses will be induced in the interlayer 24 and the adhesive layers 42 and 44, all of which are interposed between and connected to the surfaces 20 and 22. Since the shear modulus of an epoxy adhesive, for example, is generally about $10^5$ psi, a relatively small shear strain across a layer of adhesive will produce a high shear stress, which may easily exceed the ultimate shear strength of the adhesive. Elastomers, on the other hand, generally have shear moduli in the range of 50 to 500 psi. Consequently, a layer of elastomer can accommodate a relatively large shear strain without experiencing a shear stress that would exceed the ultimate shear strength of the elastomer. In addition, since the strain experienced by the layer of elastomer, for example, is determined by the thickness of the layer and the distance through which the layer is deflected, the layer of elastomer can be made to accommodate a larger deflection, or difference in the strains experienced by the hub 14 and rotor 12, for example, by increasing the thickness of the layer.

In the energy storage device 10, the shear modulus and the thickness of the body of elastomer 40 are selected so that the elastomer 40 will deflect in shear in preference to the layers of adhesive 42 and 44. (The thickness of the elastomer 40 is measured normal to the surfaces 20 and 22.) The shear modulus and thickness of the elastomer 40 are also selected to permit the elastomer 40, together with the adhesive layers 42 and 44, to accommodate, through shear deflection, the total difference in the strains experienced by the hub 14 and the rotor 12. The difference in the strains on the hub 14 and the rotor 12, which will increase with increasing rotational speed, is accommodated at all speeds of the rotor up to its ultimate bursting speed without inducing a shear stress in the elastomer 40 which would exceed the ultimate shear strength of the elastomer and without inducing shear stresses in the layers of adhesive 42 and 44 which would exceed the ultimate shear strength of the adhesive. At the same time, there is no mechanical limitation, such as a substantially inextensible (i.e., high modulus) linkage between the rotor 12 and the hub 14, on the strain differential experienced across the interlayer 24 and the adhesive layers 42 and 44 or on the deflection required of the interlayer and adhesive layers. Because of the low shear modulus of the body of elastomer 40, the elastomer typically needs to be only a few hundredths, or even a few thousandths, of an inch thick to accommodate the difference in strains experienced by the hub 14 and the rotor 12. Nonetheless, since the elastomer 40 may also be subjected to high oscillatory torsional stresses or torsional vibrations as it transmits rotational motion from the hub 14 to the rotor 12, the thickness of the elastomer may be increased to enable the elastomer better to accommodate and reduce the transmission of torsional vibrations.

As used in the preceding paragraph, the ultimate bursting speed of the rotor 12 is the speed at which the rotor will burst or disintegrate due to the centrifugal force imposed on the rotor. Theoretically, the stresses due to centrifugal force at the ultimate speed of the rotor 12 exceed the ultimate tensile strength of the material(s) of which the rotor is fabricated. The ultimate bursting speed of the rotor 12 is significantly greater than the speed that the rotor could attain if joined to the hub 14 solely by the adhesive layers 42 and 44. As previously explained, the adhesive layers can only accommodate a relatively small strain, and hence only a relatively small difference between the strains experienced by the rotor 12 and the hub 14, without experiencing shear stresses that would exceed the ultimate shear strength of the adhesive. Without the interlayer 24, the rotor 12 could attain only a small fraction of its optimal operating speed, which would be close to its ultimate bursting speed, before the rotor would separate from the hub 14 due to failure of the adhesive layers 42 and 44.

In addition to accommodating the differential shear strains experienced by the rotor 12 and the hub 14, the body of elastomer 40 in the interlayer 24 will tend to reduce the transmission of torsional vibrations from the rotor to the hub and the shaft 26, and vice versa. Torsional vibrations are the result of instantaneous or momentary variations between the rotational speeds of the rotor 12 and the shaft 26. Deflections, such as flapping of the rotor 12 due to its flexibility in directions parallel to the axis 32, can be accommodated by the resilient interlayer 24 without the transmission of significant stresses and loads to the shaft 26.

Gimballing or tilting movements of the rotor 12 relative to the shaft 26 can also be permitted because of the flexibility of the interlayer 24. The ability to allow gimballing movements is important because it reduces the extremely high gyroscopic moments that would otherwise be generated if, for example, the rotor 12 had to move with the shaft 26 as it was quickly tilted out of alignment with its normal axis of rotation 32. The gyroscopic moments, which would tend to resist tilting motions of the shaft 26, would increase with increasing speed of the tilting motion imposed on the rotor 12. The flexibility of the interlayer 24 thus allows the shaft 26 to tilt quickly and generally independently relative to the rotor 12, or vice versa. At the same time, the spring-like resilience of the interlayer 24 causes the rotor 12 to follow the shaft 26 and return to its normal perpendicular orientation with respect to the shaft at a somewhat slower speed than the speed at which the shaft moved. Because of the slower tilting speed, the gyroscopic moments are less. The amount of gimballing permitted can be controlled by varying the thickness, diameter, and stiffness of the interlayer 24 and by varying the diameter of the flange portion 16 of the hub 14. An increased degree of gimballing can be permitted by forming the surface 20 of the hub 14 as a convexly curved surface, for example, rather than a flat surface as shown.

The interlayer 24 will be most effective in accommodating differential strains when interposed between points or areas on the rotor 12 and the hub 14 which experience the greatest differences in radially directed strains due to centrifugal force. In other words, the interlayer 24 should be interposed between the rotor 12 and the hub 14 along a surface of the rotor 12 which is adjacent to its largest diameter. In a disc-type flywheel with square edges, such as is shown in FIGS. 1 and 2, the interlayer 24 can be optimally effective when simply bonded to either side of the rotor 12 along a surface such as surface 22. An interlayer will be less effective when used with a flywheel such as that shown in FIG. 1 of Call U.S. Pat. No. 3,496,799, in which an isotropic rotor tapers from a greatest thickness adjacent the hub to a smallest thickness at its outer periphery. With the tapered thickness rotor of the Call patent, a hub would be attached to a surface of the flywheel adjacent a portion of the flywheel having approximately the same diameter as the hub. FIG. 7 of Rabenhorst et al U.S. Pat. No. 3,788,162 illustrates such an attachment. The difference in the strains experienced by the hub and the rotor at the hub-rotor interface will be minimized, as will the effectiveness or utilization of any interlayer used at the interface. As previously discussed, it is greatly preferable to utilize a rotor that is, within its outer periphery, a continuous member and does not have any openings formed in it. A continuous or solid rotor will minimize the stresses built up in the rotor and maximize the rotational speed and energy storage capacity of the rotor.

The foregoing discussion has been directed toward providing an interlayer 24 which will accommodate the strain differential between the rotor 12 and the hub 14 at any rotational speed up to the speed at which the rotor 12 bursts or otherwise fails. Nonetheless, it may be desirable for safety reasons to have the interlayer 24 fabricated so that it will fail at some predetermined speed less than the ultimate bursting speed of the rotor 12. An engineered failure of the interlayer 24 prior to the ultimate bursting speed of the rotor 12 could be achieved by having the interlayer 24 fabricated or dimensioned so as to fail under the shear stress imposed by the differential shear strains experienced by the rotor 12 and hub 14. Another alternative would be to have the interlayer fail due to radial and tangential stresses imposed by the centrifugal force acting on the interlayer itself. Thus, FIG. 5 of the drawing shows a partial view of an energy storage device 10' in which a rotor 12' is joined to a hub 14' by an interlayer 24' that is annular in shape rather than disc shaped. Because of the large central opening in the interlayer 24', the tangential stress in the interlayer due to centrifugal force at any rotational speed of the rotor 12' will be significantly increased in comparison to a disc-shaped interlayer that has the same outer diameter. By adjusting the thickness, radial width, density, shear strength, and shear modulus of the elastomer incorporated in the interlayer 24', the interlayer may be designed to fail through the imposition of tangential stresses due to centrifugal force at some speed of the rotor 12' less than the speed at which the rotor 12' would burst. Such failure would typically take the form of a shear failure of the middle portion of the thickness of the interlayer 24' with respect to the bonded surfaces of the interlayer.

Figure 5:
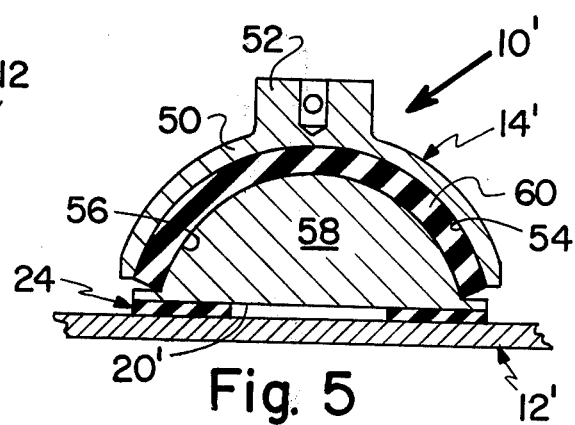
FIG. 5 is a sectional view, corresponding to FIG. 3, of another embodiment of a rotary energy storage device according to the present invention.

The energy storage device 10' of FIG. 5 also incorporates, in its hub 14', a feature that will allow the rotor 12' a gimballing motion with respect to the shaft (not shown) in addition to the limited motion permitted by an elastomeric interlayer. The hub 14' includes an outer member 50 that has a tubular socket 52 to receive a shaft (not shown) and a concave, arcuate surface 54 opposite the socket 52. The concave arcuate surface 54 is generally spherical in configuration and is concentrically disposed about a corresponding but convex spherical surface 56 formed on an inner member 58 of the hub 14'. Opposite its convex arcuate surface 56, the inner member 58 provides a flat mounting surface 20' to which the interlayer 24' is bonded. Between the two arcuate surfaces 54 and 56 is bonded a layer of elastomer 60. The layer of elastomer 60 permits a ball-and-socket type gimballing motion of the inner member 58 with respect to the outer member 50, without any significant wear such as would be experienced by a conventional ball-and-socket type joint. The elastomer layer 60 also provides a restoring spring-like force that will tend to return the rotor 12' from any deflected position to its normal perpendicular orientation with respect to the shaft (not shown). By appropriate location of the common center of the spherical surfaces 54 and 56, and by adjustment of the cocking stiffness of the layer of elastomer 60 relative to the cocking stiffness of the elastomer in the interlayer 24', the apparent mounting point, or effective elastic center, of the rotor-to-hub mounting system can be located within and at or near the geometric center of the rotor 12. Such a location of the effective elastic center can eliminate undesirable coupling of forces and moments, for example, which act on the rotor 12' when it gimbals or tilts relative to the shaft 26.

The use of a single hub and interlayer to mount a rotor, as shown in FIGS. 1 to 5, has the disadvantage of imposing the weight of the rotor as a static tensile load on the interlayer in most orientations of the rotor. Tension loads on a body of elastomer, such as that incorporated into the interayer 24, tend to have a more adverse effect on the fatigue life of the elastomer than compressive loads of the same magnitude. Although the hub 14 of FIG. 1 could be disposed below the rotor 12, it would be preferable for many installations of a flywheel to have the drive shaft 26 extending upwardly from the rotor, rather than downwardly. To facilitate having the shaft 26 project upwardly, for example, from the rotor 12, the rotor may be mounted on two hubs 14, as shown in FIG. 6.

Figure 6:
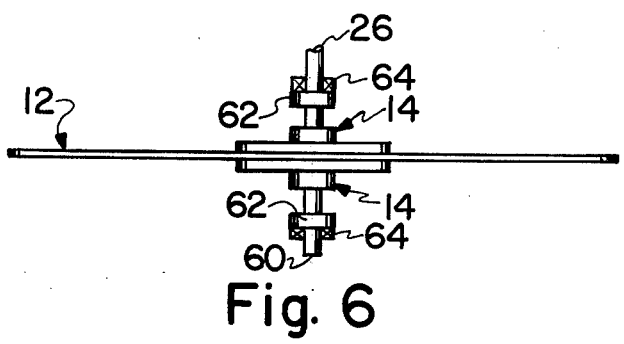
FIG. 6 is a side view, corresponding to FIG. 2, of yet another embodiment of a rotary energy storage device according to the invention.

In the flywheel installation of FIG. 6, the rotor 12 is bonded on each side to an interlayr 24. The two interlayers 24 are bonded, in turn, to two different hubs 14 located one on each side of the rotor 12. The upper hub 14 is attached to the drive shaft 26, while the lower hub 14 is attached to a stub shaft 60. Each of the shafts 26 and 60 carries an annular thrust collar 62, which engages an antifriction bearing element 64. The spacing between the two bearing elements 64 is such that the bodies of elastomer in the interlayers 24 are precompressed to avoid any tension loads. The use of two hubs 14 and two interlayers 24 not only avoids tension loads in the interlayers, it also causes the elastic center of the mounting system for the rotor 12 to be located within the rotor. In contrast, the mounting arrangement shown in FIGS. 1 to 4 results in the elastic center of the mounting arrangement being located on one side of and outside the rotor 12. The placement of the bearings 64 on both sides of the rotor 12 also reduces the radial loads and gyroscopic moments imposed on each bearing, as compared to a situation in which one or two bearings are located on just one side of a rotor.

Although the term "hub" has been used in the preceding descriptions to denote amember attached to the end of a shaft and having a larger diameter than the shaft, a hub for purposes of the present invention could merely be an end portion of a shaft. If the hub were merely an end portion of a shaft, the interlayer could be bonded to the end surface of the shaft or to the annular circumfeential surface of the shaft adjacent to its end. In any embodiment of the invention, the body of elastomer incorporated into the interlayer need not be flat, but might be conical or spherical, for example. The body of elastomer might also be segmented or include shims of higher modulus materials to increase its stiffness with respect to compressive loads applied along or parallel to the axis 32. The important requirement of the elastomer is that it have the thickness and shear modulus necessary to permit the interlayer to reduce to acceptable levels the shear stresses imposed on any materials interposed between a hub and a rotor. Ordinarily, however, a flat interlayer will offer the greatest reduction in such shear stresses.

It will be understood that the embodiments described above are merely exemplary and that persons skilled in the art may make many variations and modifications without departing from the spirit and scope of the invention. All such modifications and variations are intended to be within the scope of the invention as defined in the appended claims.

What is claimed is:

1. A rotary energy storage device comprising:
  (a) rotor means for storing energy when rotated about an axis that passes through said rotor means, the rotor means having a mounting surface and an outer periphery, at least a portion of the outer periphery being disposed farther from the axis of rotation in a direction generally perpendicular to the axis than substantially any other portion of the rotor means, the rotor means being free of any substantial increase in thickness adjacent said at least a portion of the outer periphery, the thickness of the rotor means being measured generally parallel to the axis of rotation, said rotor means within its outer periphery being a continuous member without any opening formed therethrough;
  (b) hub means for coupling to rotatable shaft means, the hub means having a mounting surface spaced from the mounting surface of the rotor means, the hub means also having a maximum dimension measured generally perpendicular to the axis of rotation which is less than a correspondingly measured maximum dimension of the rotor means;
  (c) interlayer means disposed between the mounting surfaces of the rotor means and the hub means, a first surface of the interlayer means being bonded to the mounting surface of the hub means and a second surface of the interlayer means being bonded to the mounting surface of the rotor means,
  the rotor means and hub means being constructed relative to each other such that upon rotation of the energy storage device the hub means experiences a strain at its mounting surface due to centrifugal force which is less than a corresponding strain experienced by the rotor means at its mounting surface due to centrifugal force, the difference between the strain at the mounting surface of the hub means and the strain at the mounting surface of the rotor means inducing a shear stress in the interlayer means,
  the interlayer means having (i) a thickness measured normal to at least one of its first and second surfaces and (ii) a shear modulus which have a predetermined interrelationship so as to permit the shear stress induced in the interlayer means to be accommodated through deformation of the interlayer means without structural failure and without bond failure due to said induced shear stress when the energy storage device is rotating at any speed up to a speed at which the rotor means would fail due to radially directed centrifugal loads imposed upon the rotor means.

2. A rotary energy storage device, according to claim 1, wherein the interlayer means is shaped and dimensioned to insure that it will fail due to generation within the interlayer means of stresses due to centrifugal force other than said induced shear stress at a rotational speed of the energy storage device less than the rotational speed at which the rotor means would fail.

3. A rotary energy storage device, according to claim 1, wherein the interlayer means includes a body of elastomer.

4. A rotary energy storage device, according to claim 1, wherein the rotor means includes at least one rotor element which extends generally across the rotor means and which is oriented transverse to the axis of rotation, the rotor element having an outer periphery and within said outer periphery being a continuous member without any opening formed therein.

5. A rotary energy storage device, according to claim 4, wherein the rotor means includes a multiplicity of rotor elements, each of said rotor elements being an elongated filamentary member and said filamentary members being embedded in a matrix material.

6. A rotary energy storage device, according to clam 1, wherein the rotor means and the hub means are constructed relative to each other such that (i) the difference between the strains experienced at the mounting surfaces of the hub means and the rotor means and (ii)

the shear stress induced in the interlayer means both continuously increase with increasing rotational speed of the energy storage device.

7. A rotary energy storage device, according to claim 1, wherein the interlayer means is bonded to the mounting surfaces of the hub means and the rotor means in a manner such that the interlayer means experiences generally a maximum difference between the strain experienced by the hub means and the strain experienced by the rotor means.

8. A rotary energy storage device, according to claim 1, wherein the rotor means is rotatable about an axis that passes through the rotor means and wherein the interlayer means is fabricated and dimensioned to permit limited tilting motions of the rotor means about an axis transverse to said axis of rotation.

9. A rotary energy storage device, according to claim 1, wherein the rotor means has an energy storage capacity of at least ten watt-hours per pound.

10. A rotary energy storage device comprising:
(a) rotor means having a mounting surface, an outer periphery and an ultimate speed at which the rotor means will fail due to centrifugal loads imposed on the rotor means, said rotor means within its outer periphery being a continuous member without any opening formed therethrough;
(b) hub means for coupling to rotatable shaft means, the hub means having a mounting surface spaced from the mounting surface of the rotor means;
(c) interlayer means disposed between the mounting surfaces of the rotor means and the hub means;
(d) a first layer of adhesive bonding a first surface of the interlayer means to the mounting surface of the hub means; and
(e) a second layer of adhesive bonding a second surface of the interlayer means to the mounting surface of the rotor means,
the rotor means and hub means being constructed relative to each other such that upon rotation of the energy storage device the hub means experiences a strain at its mounting surface due to centrifugal force which is different from a corresponding strain experienced by the rotor means at its mounting surface due to centrifugal force, the difference between the strain at the mounting surface of the hub means and the strain at the mounting surface of the rotor means inducing shear stresses in the interlayer means and the adhesive layers, the difference between the two shear strains being such that at a rotational speed of the energy storage device less than the ultimate speed of the rotor means the difference between the shear strains would induce shear stresses in the adhesive layers if used without any interlayer means which would exceed the shear strength of the adhesive layers and would cause failure of said adhesive layers,
the interlayer means having (i) a thickness measured normal to at least one of its first and second surfaces and (ii) a shear modulus which have a predetermined interrelationship such as to permit the interlayer means with the adhesive layers to accommodate shear stresses induced by said difference between the shear strains through deformation of said interlayer means without failure of the interlayer means due to said induced shear stresses and without failure of the adhesive layers due to said induced shear stresses at speeds of the energy storage device greater than said speed at which the adhesive layers would fail if used without any interlayer means.

11. A rotary energy storage device, according to claim 10, wherein the rotor means normally rotates at speeds greater than said speed at which the adhesive layers would fail if used without any interlayer means.

12. A rotary energy storage device, according to claim 10, wherein the interlayer means has a composition, shape, and dimensions such that it will fail at a speed greater than said speed at which the adhesive layers would fail if used without any interlayer means but less than the ultimate speed of the rotor means.

13. A rotary energy storage device, according to claim 10, wherein the rotor means and the hub means are constructed relative to each other such that (i) the difference between the strains experienced at the mounting surfaces of the hub means and the rotor means and (ii) the shear stress induced in the interlayer means both continuously increase with increasing rotational speed of the energy storage device.

14. A rotary energy storage device, according to claim 10, wherein the interlayer means includes a body of elastomer.

15. A rotary energy storage device, according to claim 14, wherein the first and second surfaces of said interlayer means are surfaces of said body of elastomer.

16. A rotary energy storage device, according to claim 10, wherein the hub means includes:
(a) a first hub member for coupling to the rotatable shaft means, the first hub member having a first arcuate surface;
(b) a second hub member for attachment to the interlayer means, the second hub member having a second arcuate surface which is presented to and spaced from the first arcuate surface; and
(c) a layer of elastomer disposed between and secured to the first and second arcuate surfaces.

17. A rotary energy storage device, according to claim 10, wherein the rotor means is rotatable about an axis that passes through the rotor means, and wherein the rotor means includes a multiplicity of anisotropic filamentary members which are embedded in a resin matrix and which are oriented generally transverse to said axis of rotation.

18. A rotary energy storage device, according to claim 10, wherein the mounting surfaces of the hub means and the rotor means are disposed opposite and presented to each other, and wherein the first and second surfaces of the interlayer means are disposed opposite each other.

19. A rotary energy storage device, according to claim 10, wherein the interlayer means is bonded to the mounting surfaces of the hub means and the rotor means in a manner such that the interlayer means experiences generally a maximum difference between the strain experienced by the hub means and the strain experienced by the rotor means.

20. A rotary energy storage device, according to claim 10, wherein the rotor means has an outer periphery of which at least a portion is disposed farther from the axis of rotation in a direction generally perpendicular to the axis than substantially any other portion of the rotor means, the rotor means being free of any substantial increase in thickness adjacent said at least a portion of its outer periphery, the thickness of the rotor means being measured generally parallel to the axis of rotation, and wherein the hub means has a maximum dimension measured generally perpendicular to the axis of rotation which is less than a correspondingly measured maximum dimension of the rotor means.

21. A rotary energy storage device comprising:
(a) a rotor having an outer periphery, said rotor being rotatable about an axis passing through said rotor, the rotor having an ultimate rotational speed at which the rotor will fail due to centrifugal loads imposed on the rotor, said rotor within its outer periphery being a continuous member without any opening formed therethrough;
(b) hub means for mounting on a rotatable shaft, the hub means having a mounting surface presented to and speced from a generally parallel opposed surface of the rotor;
(c) interlayer means disposed between the rotor and the hub means, the interlayer means including a body of elastomeric material;
(d) a first layer of adhesive bonding a first surface of said body of elastomeric material to the mounting surface of the hub means; and
(e) a second layer of adhesive bonding a second surface of said body of elastomeric material opposite the first surface to the opposed surface of the rotor, the rotor and the hub means being constructed relative to each other such that upon rotation of the energy storage device the hub means experiences a strain at its mounting surface due to centrifugal force which is different from a corresponding strain experienced by the rotor at its opposed surfaces due to centrifugal force, the difference between the strain at the mounting surface of the hub means and the strain at the opposed surface of the rotor inducing shear stresses in the interlayer means and the adhesive layers, both (i) the difference between the two shear strains and (ii) the resultant shear stress induced in the interlayer means continuously increasing with increasing rotational speed of the energy storage device, the difference between the shear strains also being such that at a rotational speed of the energy storage device less than the ultimate speed of the rotor the difference between the shear strains would induce shear stresses in the adhesive layers if used without any interlayer means which would exceed the shear strength of the adhesive layers and would cause failure of said adhesive layers,
the interlayer means having (i) a thickness measured normal to at least one of its first and second surfaces and (ii) a shear modulus which have a predetermined interrelationship such as to permit the interlayer means with the adhesive layers to accommodate shear stresses induced by said difference between the shear strains through deformation of said interlayer means without failure of the interlayer means due to said induced shear stresses and without failure of the adhesive layers due to said induced shear stresses at speeds of the energy storage device greater than said speed at which the adhesive layers would fail if used without any interlayer means.

22. A rotary energy storage device, according to claim 21, wherein the rotor is fabricated of a multiplicity of filamentary elements embedded in a resin matrix, the filamentary elements extending across the rotor and being oriented transverse to said axis of rotation.

23. A rotary energy storage device comprising:
(a) rotor means including at least one rotor element and being rotatable about an axis that passes through said rotor means, the rotor element extending across the rotor means and being oriented transverse to said axis of rotation, the rotor means and the rotor element each having an outer periphery and each of said rotor means and said rotor element within their respective outer periphery being a continuous member without any opening formed therein, at least a portion of the outer periphery of the rotor means being disposed farther from the axis of rotation in a direction generally perpendicular to the axis than substantially any other portion of the rotor means, the rotor means being free of any substantial increase in thickness adjacent said at least a portion of the outer periphery, the thickness of the rotor means being measured generally parallel to the axis of rotation;
(b) hub means for coupling to rotatable shaft means, the hub means having a mounting surface spaced from a mounting surface of the rotor means, the hub means also having a maximum dimension measured generally perpendicular to the axis of rotation which is less than a correspondingly measured maximum dimension of the rotor means; and
(c) interlayer means disposed between the mounting surfaces of the rotor means and the hub means, a first surface of the interlayer means being bonded to the mounting surface of the hub means and a second surface of the interlayer means being bonded to the mounting surface of the rotor means whereby the rotor means is rotatable with the hub means about said axis of rotation, the interlayer means including at least one body of elastomeric material.

24. A rotary energy storage device, according to claim 23, wherein the opposed surface of the rotor means is disposed adjacent to a portion of the rotor means which has generally the largest dimension measured (i) across said rotor means and (ii) generally normal to said axis of rotation.

25. A rotary energy storage device, according to claim 23, wherein the rotor means includes a multiplicity of rotor elements and wherein each of said rotor elements is an elongated filamentary member, the filamentary members being embedded in a resin matrix.

26. A rotary energy storage device, according to claim 23, wherein each of the first and second surfaces of the interlayer means is a surface of a body of elastomer.

27. A rotary energy storage device, according to claim 23, wherein the hub means includes;
(a) a first hub member for attachment to the rotatable shaft means, the first hub member having a first arcuate surface;
(b) a second hub member for attachment to the interlayer means, the second hub member having a second arcuate surface which is presented to and spaced from the first arcuate surface; and
(c) a layer of elastomer disposed between and secured to the first and second arcuate surfaces.

28. A rotary energy storage device comprising:
(a) a rotor rotatable about an axis passing through said rotor, the rotor being fabricated of a multiplicity of filamentary elements embedded in a resin matrix, the filamentary elements extending across the rotor and being oriented transverse to said axis of rotation, the rotor having an outer periphery of which at least a portion is disposed farther from the axis of rotation in a direction generally perpendicular to the axis than substantially any other portion of the rotor, the rotor being free of any substantial increase in thickness adjacent said at least a portion of the outer periphery, the thickness of the rotor being measured generally parallel to the axis of rotation;

(b) hub means for mounting on a rotatable shaft, the hub means having a mounting surface presented to and spaced from a generally parallel opposed surface of the rotor, the hub means also having a maximum dimension measured generally perpendicular to the axis of rotation which is less than a correspondingly measured maximum dimension of the rotor means; and (c) interlayer means disposed between the rotor and the hub means, the interlayer means including a body of elastomeric material which has a first surface bonded to the mounting surface of the hub means and a second surface opposite the first surface and bonded to the opposed surface of the rotor so that the rotor is rotatable with the hub means about said axis of rotation, the opposed surface of the rotor being disposed adjacent to at least one filamentary element having a length measured across the rotor at least as great as the length of substantially any other filamentary element in the rotor, the rotor within its outer periphery being a continuous member without any opening formed therethrough.

* * * * *